Geo. F. Blake's
Improved PISTON
Boston, Mass.
No. 120,565.    Patented Nov. 7, 1871.
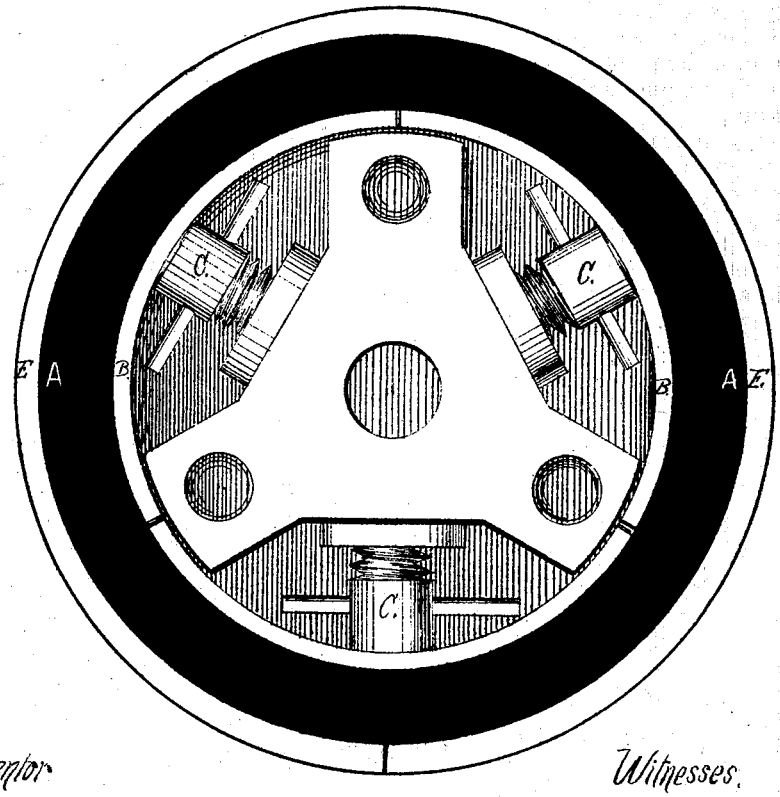
Inventor
Geo F. Blake
Witnesses,
E. R. Stansbury.
Chas. F. Stansbury
atty.

UNITED STATES PATENT OFFICE.

GEORGE F. BLAKE, OF BOSTON, MASSACHUSETTS.

IMPROVEMENT IN PISTON-PACKINGS.

Specification forming part of Letters Patent No. 120,565, dated November 7, 1871.

*To all whom it may concern:*

Be it known that I, GEORGE F. BLAKE, of Boston, county of Suffolk, Commonwealth of Massachusetts, have invented certain Improvements in Pistons for Pumps and Engines, of which the following is a specification, referring to the accompanying drawing and to letters of reference marked thereon.

My invention consists in providing a ring of rubber or similarly elastic material between the inner rings, which bear on set-screws, and the outer rings, which form the packing, for the purpose of giving an elastic and adjustable pressure upon the packing.

In the drawing, my improved piston is shown with the follower removed.

A is the rubber ring; B, the inside ring, against which the screws C C C bear. E is the outside packing-ring. The ring B is cut in two or three pieces, and has a set-screw bearing against the center of each piece. The outer ring E is also cut to allow it to expand.

In setting the packing pressure is brought to bear on the inner ring, from which it is communicated to the outer or packing-ring E by the rubber ring A, so that a uniform pressure is exerted by the packing upon the cylinder, while the elasticity of the rubber allows the packing to conform to any irregularities in the bore.

I claim—

As an improvement in pistons for pumps and engines, a piston formed by the insertion, between the inner and outer rings B E of metallic packing, of the rubber ring A, controlled by the adjusting-screws C, in the manner and for the purpose specified.

The above specification signed and witnessed at Washington this 9th day of June, A. D. 1871.

GEO. F. BLAKE.

Witnesses:
CHAS. F. STANSBURY,
E. R. STANSBURY. (151)